United States Patent
Piefer et al.

(10) Patent No.: US 7,148,635 B1
(45) Date of Patent: Dec. 12, 2006

(54) MOTOR DRIVE WITH SYNCHRONIZED TIMING

(75) Inventors: Richard W. Piefer, Brookfield, WI (US); Thomas J. Rehm, Mequon, WI (US); Takayoshi Matsuo, Brown Deer, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/231,628

(22) Filed: Sep. 21, 2005

(51) Int. Cl.
*H02P 5/46* (2006.01)

(52) U.S. Cl. .......................... 318/85; 318/34; 318/41; 318/68; 318/52

(58) Field of Classification Search ............. 318/85, 318/34, 41, 68, 52
See application file for complete search history.

(56) References Cited

U.S. PATENT DOCUMENTS

| | | | | |
|---|---|---|---|---|
| 3,702,071 A | * | 11/1972 | Masar | ........................ 72/9.4 |
| 3,934,182 A | * | 1/1976 | Donohue et al. | ............. 318/85 |
| 4,310,878 A | * | 1/1982 | Hyatt | .......................... 700/78 |
| 6,586,898 B1 | * | 7/2003 | King et al. | .................. 318/254 |
| 6,815,920 B1 | * | 11/2004 | Cohen et al. | ................ 318/599 |
| 6,864,646 B1 | * | 3/2005 | Rahman et al. | ............... 318/41 |
| 6,943,521 B1 | * | 9/2005 | Kurokawa et al. | .......... 318/625 |
| 6,956,339 B1 | * | 10/2005 | Kureck et al. | ................ 318/85 |

* cited by examiner

*Primary Examiner*—Rita Leykin
(74) *Attorney, Agent, or Firm*—Quarles & Brady LLP; William R. Walbrun (57) ABSTRACT

A motor control system for controlling a motor includes control logic and a motor controller. The control logic is operable to generate a control signal at a first periodic time responsive to a synchronization signal. The motor controller is operable to generate a drive signal for the motor based on the reference signal at a second periodic time synchronized with respect to the first periodic time.

23 Claims, 6 Drawing Sheets

MOTOR DRIVE WITH SYNCHRONIZED TIMING

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to motor control and, more particularly, to a motor drive with synchronized timing.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Rotating motors are typically controlled by a motor drive that receives reference motor velocity and position signals and produces a torque signal that is applied to the motor. The torque signal is generally controlled using a pulse width modulated (PWM) technique. Adjustment of the torque signal based on changes to the reference velocity or position signals relative to measured feedback velocity and position signals ensures that the motor rotates at the reference velocity.

Some applications require precise motor control across multiple, synchronized motors. For example, an electronic line shaft may be employed in a printing application to move the paper or other material over rollers and through various stages of the printing process. Typical printing processes employ multiple colors, each applied at different locations along the line. Hence, to ensure print quality, the various stages are synchronized. A lack of synchronicity between the stations results in misregistration between the colors, leading to unacceptable product that may need to be scrapped.

Previous generations of printing technology employed a mechanical line shaft mechanically linked to the various printing stations. Rotation of the line shaft by an electric motor activated rollers and other printing station tools along the line to conduct the printing process. In a mechanical line shaft system, factors such as play in the mechanical linkages, stretching of the paper web, and torsional flexing of the line shaft itself make it difficult to achieve and maintain synchronicity between the printing stations, especially during periods of acceleration and deceleration of the printing system. It has been observed that when synchronicity is not maintained, product generated includes excessive flaws and is often unacceptable for intended use. Mechanical line shafts also have reduced flexibility in addressing print changes. Hence, where changes are required, down time may be excessive.

More modern printing systems, commonly referred to shaftless printing systems or electronic line shaft systems, employ a plurality of motors and associated rollers that are electrically synchronized, as opposed to mechanically synchronized. Lack of synchronicity in an electronic line shaft results in similar problems, such as color misregistration, evident in a mechanical line shaft system.

When operating a plurality motors synchronously in an automated system, several factors exist that may cause the position of the motors to deviate from each other even though they are all operating pursuant to a single reference velocity signal. For instance, motor inertia between motors at different stations is often non-uniform and can cause one motor to drift from the other motors.

Typical motor drives for controlling motors are implemented using software executed by one or more central processing units (CPUs). As CPU clock rates have risen, so too has the control bandwidth available to a motor drive. However, higher control bandwidth does not necessarily equate to higher performance. To this end, as bandwidth increases, so does the susceptibility of a motor drive to noise which can lead to operation, rattles, clunks, tendency to resonate, lack of robust performance, etc. In fact, in many cases, the noise level that results from operating a drive at a maximum bandwidth associated with high CPU clock cycles, instead of increasing control performance has been known to degrade performance appreciably. In this regard, most processes have an ideal operational bandwidth that is much lower than the high bandwidth associated with high speed CPU clock cycles. For example, an ideal operational bandwidth may be one or two orders of magnitude less than the bandwidth associated with high CPU clock cycles.

Position errors in a drive system are controlled by a position regulator that acts on the difference between a reference position and a feedback position determined using a position feedback device such as, for instance, an optical encoder. That difference is commonly referred to in the motor control industry using terms such as "following error", "tracking error", and "position error". A key performance measure of a position regulator is to quantify regulator tracking (i.e., how close to zero can the error be maintained under specific conditions). Typically, tracking is evaluated under two such conditions, steady state velocity, and acceleration/deceleration.

Position error in a real system contains a noise component with zero average value and a "DC component" that may or may not be zero. The DC component may be referred to as simply "position error". Under steady state velocity conditions position error can readily be held to zero using techniques that are well understood in the industry. However, in applications where a high degree of precision is required and periods of acceleration and deceleration occur, known techniques of minimizing the position error have been less successful.

In typical motor drives the tasks for generating reference signal updates, position updates, velocity updates, and PWM updates to the torque signal are processed discretely, and at different update intervals. For example, the PWM task typically has the highest update frequency, followed by the velocity task, and finally by the reference and position tasks. Besides having different update frequencies, the tasks may be performed by different processing units (e.g., microprocessors) within the motor drive that operate asynchronously and at different clock speeds.

Because the various tasks are not synchronized, a more frequently occurring task, such as the PWM update, may operate on data that is relatively stale during certain cycles. For example, where the PWM update happens to occur immediately after a velocity update, the data is most current. Because the PWM and velocity tasks execute asynchronously, during subsequent updates the time interval between the last velocity update and the current PWM update will vary, a phenomenon commonly referred to as a beat frequency, which occurs as the signals move in and out of phase. This beat frequency can give rise to a noticeable error in a highly sensitive application, such as printing.

BRIEF SUMMARY OF THE INVENTION

One aspect of the present invention is seen in a motor control system for controlling a motor that includes control logic and a motor controller. The control logic is operable to generate a control signal at a first periodic time responsive to a synchronization signal. The motor controller is operable to generate a drive signal for the motor based on the reference signal at a second periodic time synchronized with respect to the first periodic time.

Another aspect of the present invention is seen in a motor control system for controlling a motor including first and second processors. The first processor is operable to perform a system task for generating a reference signal at a first periodic time responsive to a synchronization signal. The second processor is operable to perform a pulse width modulation (PWM) task for generating a drive signal for the motor based on the reference signal at a second periodic time. The second periodic time is delayed from the first periodic time by a first time interval associated with the time required for the system task to generate the reference signal.

Yet another aspect of the present invention is seen in an electronic line shaft including a synchronization unit and a plurality of drive units. The synchronization unit is operable to generate a synchronization signal. The plurality of drive units are controlled in accordance with a common reference signal. Each drive unit includes control logic and a motor controller. The control logic is operable to generate a torque reference signal at a first periodic time responsive to the synchronization signal. The torque reference signal is generated based on the common reference signal and at least one feedback signal. The motor controller is operable to generate a drive signal for the motor based on the torque reference signal at a second periodic time. The second periodic time is delayed from the first periodic time by a first time interval associated with a time required for the control logic to generate the torque reference signal.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
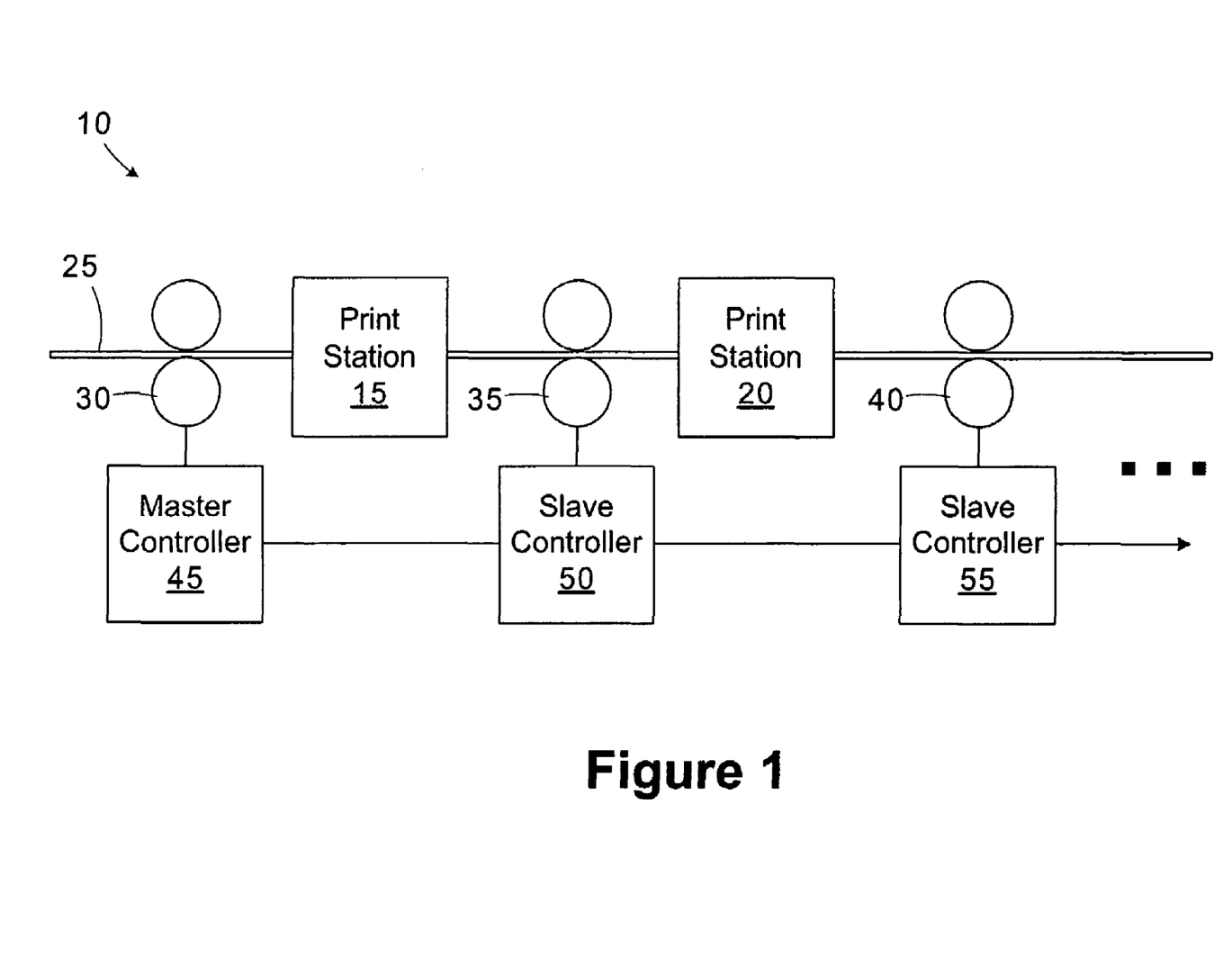
FIG. 1 is a simplified diagram of an electronic line shaft in accordance with one embodiment of the present invention.

Referring now to the drawings wherein like reference numbers correspond to similar components throughout the several views and, specifically, referring to FIG. 1, the present invention shall be described in the context of an electronic line shaft 10. In the illustrated embodiment, the electronic line shaft 10 is employed to control a printing process, however, the application of the present invention is not limited to any particular process or application. The phrase "electronic line shaft" is intended to apply to any system in which two or more motors are controlled in a synchronized fashion to facilitate a process.

A plurality of print stations 15, 20, perform printing operations on a moving web, 25 (e.g., paper). The printing operations performed by the print stations 15, 20 may vary. For example, some printing systems print using 4 color print processes. Each print station 15, 20 prints a different color. Other print stations 15, 20 perform operations such as cutting, binding, folding, etc. Motor-driven rollers 30, 35, 40 move the web 25 through the print stations 15, 20. Although the rollers 30, 35, 40 are shown as being separate from the print stations 15, 20, in some embodiments, they may be integrated. Each motor-driven roller 30, 35, 40 has an associated controller 45, 50, 55, respectively. The controller 45 operates as a master controller and the controllers 50, 55 operate as slave controllers. The master controller 45 generates reference position and velocity data for the slave controllers 50, 55 so that synchronization may be achieved. Synchronization of the rollers 30, 35, 40 allows synchronization of the print stations 15, 20 to effectively perform the printing process.

Figure 2:
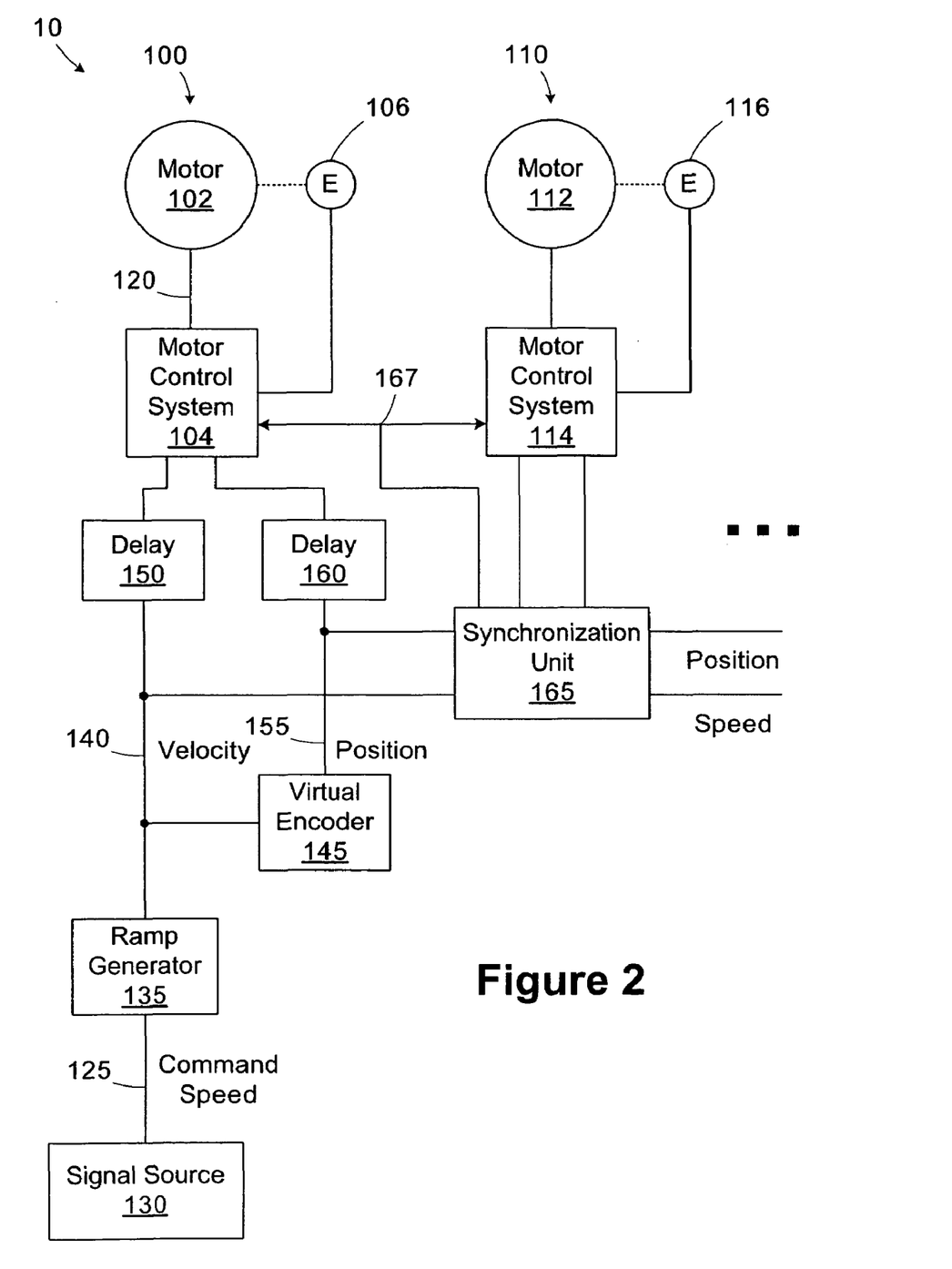
FIG. 2 is a simplified block diagram of the electronic line shaft of FIG. 1 from a control perspective.

Turning now to FIG. 2, a block diagram of the electronic line shaft 10 from a control perspective is provided. The electronic line shaft 10 includes a master drive 100 and one or more slave drives 110, only one of which is illustrated, a synchronization unit 165, a signal source 130, and a ramp generator 135. Drive 100 includes a motor 102, a motor control system 104, first and second delay elements 150 and 160, respectively, a virtual encoder 145, and an encoder 106. Slave drive 110 includes a motor 112, a motor control system 114 and an encoder 116. Motors 102, 112, motor control systems 104, 114, and encoders 106, 116 operate in similar fashions and therefore, to simplify this explanation, only motor 102, encoder 106, and motor control system 104 will be described here in any detail. Motor control system 104 generates appropriate voltages and control signals for controlling motor 102. Encoder 106 generates position information as motor 102 rotates. A plurality of radially displaced optical markings (not shown) are disposed about the periphery of a disk that rotates with the load (e.g., the rollers 30, 35, 40 in FIG. 1) associated with motor 102. Encoder 106 includes a scanner that identifies the passage of each marking to enable the determination of load position as described in more detail below.

Motor 102 receives a torque input signal 120 from the motor control system 104 and rotates the load at a reference velocity in response to the torque input signal 120. In general, the master drive 100 receives a command velocity signal 125 from signal source 130, and converts the command velocity signal into torque signals to drive motor 102. The torque signals are adjusted during operation based on factors such as a deviation between the feedback load position and reference load position, a deviation between the feedback velocity and reference velocity, and motor inertia that prevents the motor 102 from immediately reacting fully to a change in the torque input signal 120.

Referring still to FIG. 2, the signal source 130 may comprise any conventional device capable of receiving an input related to a reference velocity of motor rotation. The input can either be manually entered (e.g., via a man machine interface) or can be automatically provided to the signal source 130 via an automated control system. Ramp generator 135 receives the command velocity signal 125 from the signal source 130 and produces a reference velocity signal 140 that transitions or ramps up or down to the input command velocity signal 125. In this regard, the ramp generator 135 prevents abrupt changes in the speed command and, therefore, the torque command that is input to the motor 102 to reduce stress that would be experienced by the motor components if the torque signal were to abruptly change. The signal source 130 and ramp generator 135 may be collectively referred to as a signal generator.

During operation, when the command velocity signal 125 is applied to ramp generator 135, the ramp generator 135 determines the difference between the current command velocity signal 125 and the previous command velocity signal 125. The ramp generator 135 then determines a period of time necessary to transition the reference velocity signal 140 to a level corresponding to the command velocity signal 125. For example, the reference velocity signal 140 may be ramped linearly by the ramp generator 135, or may be ramped hyperbolically or in any other suitable manner that smoothly transitions the motor 102 to the command velocity signal 125.

The ramp generator 135 outputs the reference velocity signal 140 to virtual encoder 145 and to delay element 150. The virtual encoder 145 is virtual in that it is programmed in firmware of drive 100. The construction and operation of the virtual encoder 145 is described in greater detail in U.S. Pat. No. 6,850,021, issued Feb. 1, 2005, entitled, "PRECISION VIRTUAL ENCODER," commonly assigned to the assignee of the present application, and incorporated herein by reference in its entirety. In general, the virtual encoder 145 receives the reference velocity signal 140 from the ramp generator 135 and, based on a constant scale factor of the pulses per revolution of the motor 102 (e.g., 4096 pulses per revolution), integrates the input reference velocity signal 140. The virtual encoder 145 thus produces and outputs a reference position signal 155 that is a virtual equivalent of an integer position marking count that would originate from a real, physical encoder. The reference position signal 155 is provided to delay element 160. The reference velocity signal 140 and reference position signal 155 are also provided to synchronization unit 165 for communication to the slave drive 110 and any other slave drives in the electronic line shaft 10.

The outputs of delay elements 150 and 160 are provided as delayed velocity and position signals to motor control system 104. The reference velocity signal 140 and reference position signal 155 are delayed by the delay elements 150, 160 to provide sufficient time for the synchronization unit 165 to propagate the values to the slave drives 110 and their associated motor control systems 114 so that the master drive 100 and slave drives 110 may act on the control information in a synchronous fashion. The synchronization unit 165 also provides a synchronization signal 167 to the motor control systems 104, 114 for synchronizing the execution of tasks, as described in greater detail below in reference to FIG. 8, so that the most current data may be used. The construction and operation of the synchronization unit 165 is described in greater detail in U.S. patent application Ser. No. 09/862,941, filed May 22, 2001, entitled, "APPARATUS FOR MULTI-CHASSIS CONFIGURABLE TIME SYNCHRONIZATION", U.S. patent application Ser. No. 09/862,256, filed May 22, 2001, entitled, "PROTOCOL AND METHOD FOR MULTI-CHASSIS CONFIGURABLE TIME SYNCHRONIZATION," and U.S. patent application Ser. No. 09/862,249, filed May 22, 2001, entitled, "SYSTEM AND METHOD FOR MULTI-CHASSIS CONFIGURABLE TIME SYNCHRONIZATION", each commonly assigned to the assignee of the present application and incorporated herein by reference in its entirety.

In general, the synchronization unit 165 generates a timing signal in conjunction with the reference position and velocity and provides them to the slave drives 110. Responsive to the timing signal, the motor control systems 104, 114 act on the data to compare the feedback velocity and position to the reference values and make control adjustments synchronously and accordingly. Thus, the delay elements 150, 160 in the motor control system 104 provide a functional time equivalent of the delay in the position and speed commands that are delivered by the synchronization unit 165 to the slave motor control systems 114.

Figure 3:
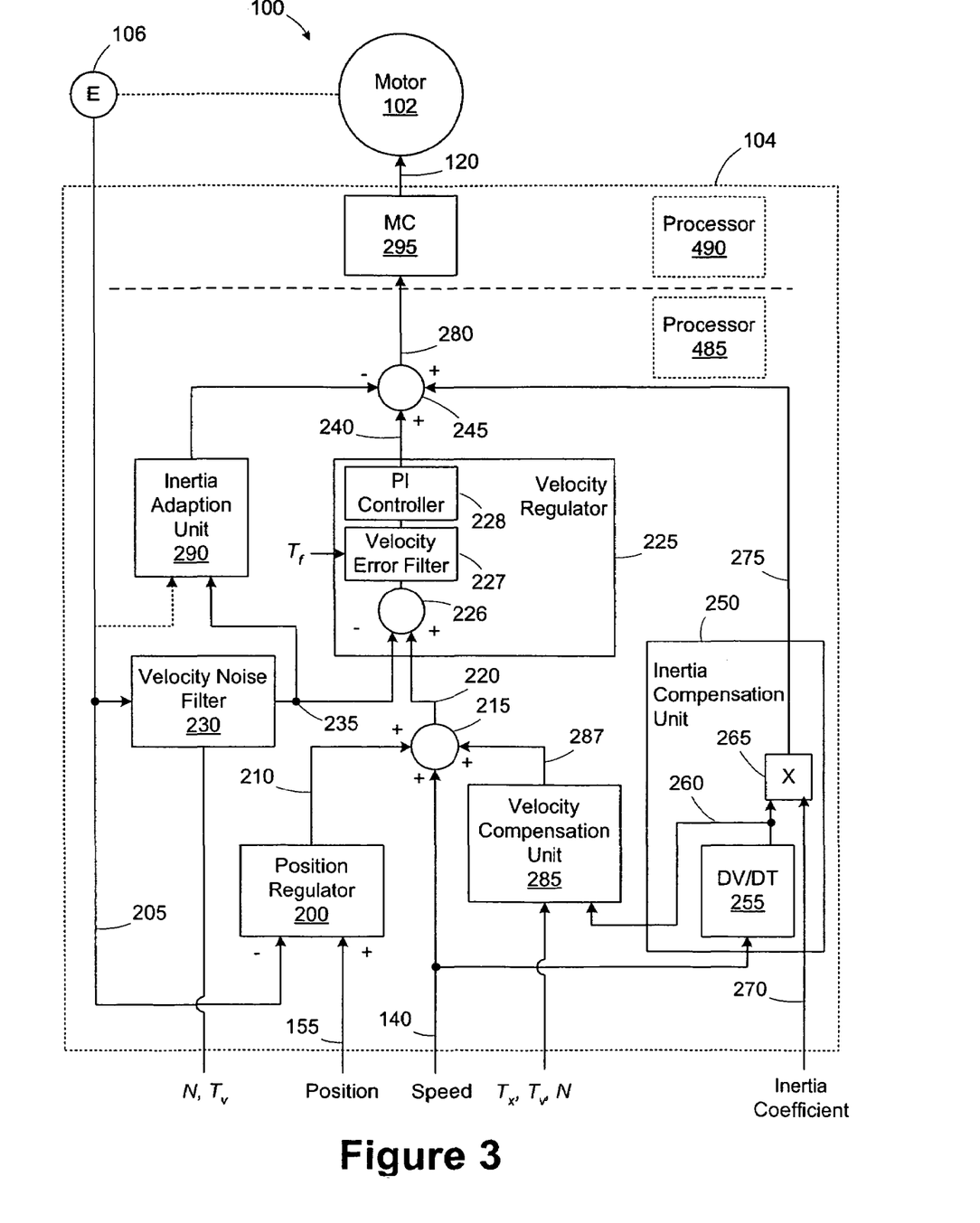
FIG. 3 is a block diagram of a motor control system in accordance with the present invention.

Turning now to FIG. 3, a simplified block diagram illustrating an exemplary motor control system 104 is provided. The operation of the motor control system 114 (see also FIG. 2) is similar, and is not described herein in the interest of simplifying this explanation. The motor control system 104 includes a position regulator 200 for controlling position errors, a velocity regulator 225 for controlling velocity errors, a velocity noise filter 230 for filtering position data to determine the velocity of the motor 102, an inertia compensation unit 250 for adjusting the control based on the expected inertial response of the motor 102, a velocity compensation unit 285 that affects the velocity control during periods of acceleration/deceleration, an inertia adaption unit 290 for generating acceleration feedback, first and second summers 215, 245 (i.e., adjustors), and a motor controller 295 that adjusts the torque input signal 120 applied to motor 102.

The reference position signal 155 is provided to the position regulator 200. The position regulator 200 also receives a feedback position signal 205 which reflects a measurement of the optical position count determined by the encoder 106. Position regulator 200 subtracts the feedback position signal 205 from the reference position signal 155 to generate a position error signal 210 corresponding to the error between the feedback position and reference position. The position error signal 210 is one component used to eventually determine the torque input signal 120 applied to the motor 102. In general, the velocity of the motor 102 is adjusted to correct the position error by adding a component to the velocity if the feedback position count trails the reference position and subtracting a component from the velocity if the feedback position count is greater than the reference position. In generating the position error signal, the position regulator 200 converts the count error to a per unit velocity consistent with the reference velocity signal 140 by multiplying the count by a factor relating the seconds per edge of the encoder 106 at the base speed of the motor 102. The summer 215 receives the position error signal 210 and the reference velocity signal 140.

Referring still to FIG. 3, inertia compensation unit 250 includes a derivative module 255 and a multiplier 265. Derivative module 255 receives the reference velocity signal 140 and, as the label implies, determines the derivative of the reference velocity signal 140 output by the ramp generator 135 (i.e., ramp rate where the derivative is an acceleration signal 260). The acceleration signal 260 is provided to multiplier 265. Multiplier 265 also receives an inertia coefficient signal 270 related to the inertia of motor 102. Multiplier 265 multiplies the inertia coefficient signal 270 and the acceleration signal 260 to provide an inertia compensation signal 275 that is provided to summer 245.

Summer 245 adds the inertia compensation signal 275 to the velocity regulator output signal 240 to generate a torque reference signal 280 for adjusting the torque input signal 120 applied to motor 102.

The inertia compensation unit 250 is provided because changes in torque input signals 120 to motor 102 are resisted by the inertia of the motor 102, whether spinning or at rest. The inertia compensation signal 275 thus provides an additional signal that counteracts the inherent resistance of motor 102 to changes in velocity. It should be appreciated that when reference velocity signals 140 is decreasing, the derivative calculated by derivative module 255 is negative, thereby reducing the torque input signal 120 applied to motor 102. The inertia coefficient 270 is determined during the commissioning of the system and represents the time required to accelerate the inertia of the motor/load to base speed at rated torque. In embodiments, where the inertia adaption unit 290 is enabled, the inertia coefficient 270 is increased by approximately 50% from the system inertia, because the inertia adaption unit 290 electronically adds 50% to the effective system inertia of the system.

Figure 6:
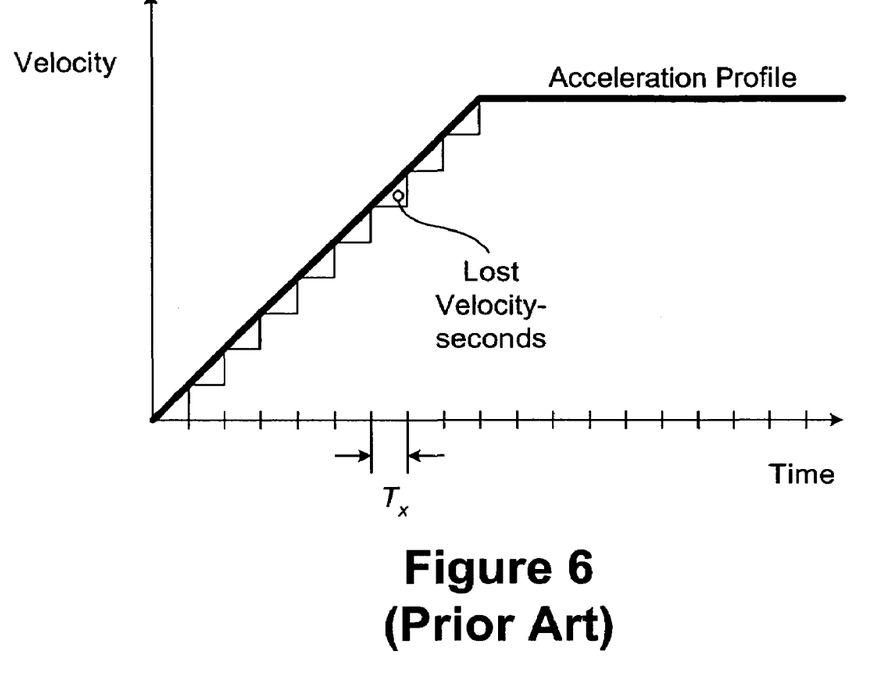
FIG. 6 is a prior art graph of velocity versus time during an acceleration event illustrating lost velocity-seconds.

Referring still to FIG. 3, the velocity compensation unit 285 receives the acceleration signal 260 and generates a velocity compensation signal 287 which is provided to summer 215. The operation of the velocity compensation unit 285 is discussed in greater detail below with reference to FIGS. 6 and 8.

Summer 215 adds signals 140, 210 and 287 and provides its output 220 to a summer 226 in the velocity regulator 225. The other input to the summer 226 in the velocity regulator 225 is provided by the velocity noise filter 230. Velocity noise filter 230 receives various input values, N and $T_v$, during a commissioning procedure and uses those values along with a feedback position signal 205 from encoder 106 to generate a feedback velocity signal 235. Operation of velocity noise filter 230 is described in greater detail below. The summer 226 in the velocity regulator 225 subtracts the feedback velocity signal 235 from the sum 220 output by summer 215 to generate an error signal. The error signal is filtered by a velocity error filter 227, and the filtered error signal is provided to a proportional-integral (PI) controller 228. The output of the PI controller 228 is a velocity regulator output signal 240 that corresponds to the difference between the sum 220 and the feedback velocity signal 235. The velocity regulator output signal 240 is provided to summer 245. As described in greater detail below, the velocity error filter 227 is coordinated to cooperate with the velocity noise filter 230 to attenuate the sideband components introduced by the velocity noise filter 230. The operation of the PI controller 228 for controlling the velocity error is well known to those of ordinary skill in the art, and in the interests of simplifying this description, is not detailed herein.

Still referring to FIG. 3, inertia adaption unit 290 generates an acceleration feedback component for inclusion by the summer 245 for adjusting the torque reference signal 280 provided to the motor controller 295. Inertia adaption unit 290 creates an electronic inertia of precise magnitude to minimize velocity regulator gain change when a mechanical inertia becomes disconnected from the motor. For instance, when using a gear-box or spring coupling at high frequencies. System stability is increased in such systems, especially when load inertia is much greater than motor inertia. The inertia adaption unit 290 may not be used in some embodiments. Typically, the inertia adaption unit 290 is not used if the system inertia is <3 times the motor inertia. The inertia adaption unit 290 may be used if there is a gear-box and/or spring coupling with a resonant frequency in the range of 30 to 200 Hz, or if the desired velocity bandwidth exceeds two thirds of the maximum bandwidth divided by the inertia ratio. The construction and operation of the inertia adaption unit 290 is described in greater detail in U.S. patent application Ser. No. 10/662,556, filed Sep. 15, 2003, entitled, "METHOD AND APPARATUS FOR PROVIDING OPTIMAL ACCELERATION FEEDBACK," commonly assigned to the assignee of the present application, and incorporated herein by reference in its entirety.

Referring to FIG. 3, the inertia adaption unit 290 may be configured to receive the feedback velocity signal 235 from the velocity noise filter 230 for determining the acceleration feedback, or alternatively, the inertia adaption unit 290 may receive the unfiltered position data from the encoder 106 (i.e., as indicated by the dashed line) and calculate an instantaneous velocity using the last two position values and the time interval between the values.

The motor controller 295 adjusts the torque input signal 120 based on variations between feedback and reference position, feedback and reference velocity, and inertia effects, as described above. In general, the motor controller 295 receives the torque reference signal 280 and implements a PWM technique for determining the torque input signal 120 applied to the motor 102. The construction and operation of the motor controller 295 are known and not described in greater detail herein.

With continued reference to FIG. 3, the operation of the velocity noise filter 230 and velocity error filter 227 are now described in greater detail. From a noise perspective the velocity noise filter 230 and velocity error filter 227 are in series. In general, the velocity noise filter 230 is a finite impulse response (FIR) filter performing a moving average function using $N=2^n$ data points to determine a velocity value. The value of n may represent a noise index and may be configured in the drive firmware to provide differing filter responses. The velocity error filter 227 is an infinite impulse response (IIR) that attenuates sidebands of the FIR velocity noise filter 230.

Referring again to FIGS. 2 and 3, in general, encoder 106 detects and counts the passage of optical markings present on a disk that rotates along with the rotating load during operation. In one embodiment, the encoder 106 may employ a two channel system that outputs pulse trains corresponding to detections of the optical markings. Phase differences between the pulse trains from each channel may be used to determine motor direction. An edge detection circuit receives both pulse trains and generates an edge signal that includes a peak for every rising and falling edge of the pulse train for each channel. Hence, four successive peaks would represent a rising edge of the A channel, a rising edge of the B channel, a falling edge of the A channel, and a falling edge of the B channel.

Figure 4:
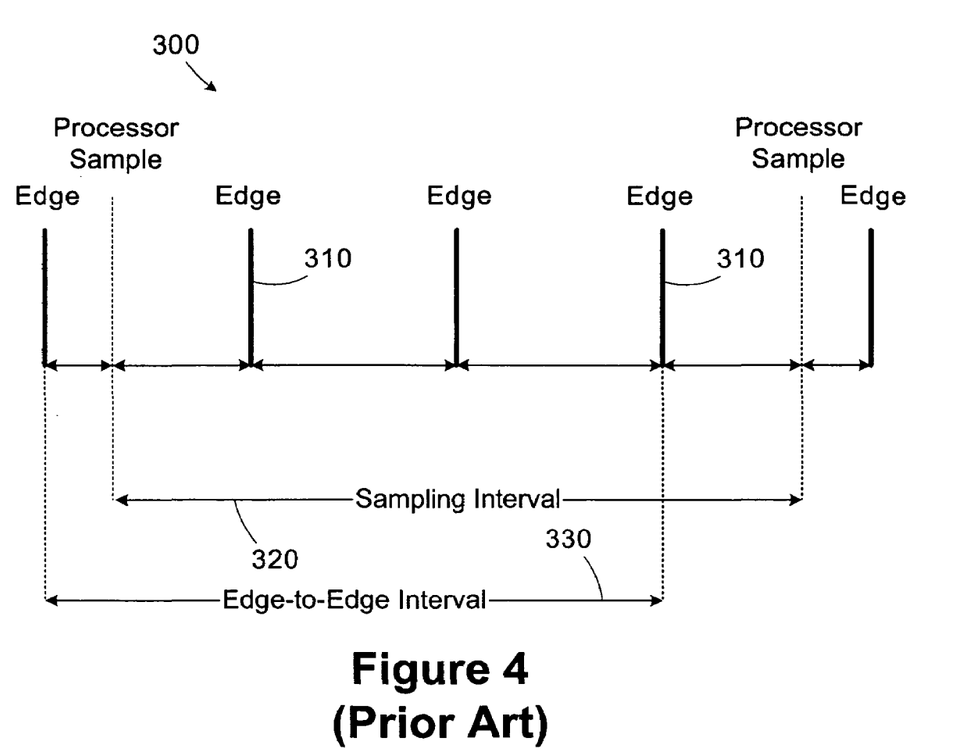
FIG. 4 is a diagram illustrating an edge signal generated from an encoder output useful for determining motor position and velocity.

FIG. 4 illustrates an exemplary edge signal 300 generated by the encoder 106. This particular encoder 106 implementation is provided for illustrative purposes only. Other types of position feedback devices may be used. In FIG. 4, the edge signal includes a plurality of edges 310 representing rising and falling edges of the signal generated by the encoder 106. The position is sampled at the frequency indicated by sampling interval 320. The edge-to-edge time (i.e., the time between edges or the time between subsequent rising edges of the A channel signal) is represented by the edge-to-edge interval 330. Note that the position is sampled in the time period between edges. An edge timer, which is reset with the receipt of every edge, may be used to track the time elapsed since the last edge so that the edge signal may be aligned to the last edge for accurate velocity determination. Thus, a position counter and edge timer may be sampled concurrently to accurately determine the number of edges that occurred during the current sampling interval as well as the precise time at which the edges occurred.

Referring again to FIG. 3, the velocity noise filter 230 multiplies the number of edges counted during the sampling interval, d_edge, by an edge scaling factor, edge_scale, and divides by time interval, d_time to generate a velocity value for the current sample:

$$\text{Velocity} = d\_edge * (edge\_scale / d\_time). \quad (1)$$

The edge scaling factor is based on the associated amount of motor travel for each edge detected. For instance, if the encoder 106 generates 4096 edges per revolution, and the motor base speed is 1750 rpm, the edge scaling factor is 60/4096/1750 sec/edge or $8.371*10^6$ at motor base speed. The resulting motor velocity calculation from Equation 1 is unitless, such that a velocity of 1.0=motor base speed. The time interval, d_time varies depending on the value selected for n. The variable, d_time, represents the edge-to-edge interval 330 shown in FIG. 4, or the change in time measured over a $2^n$ moving average interval. Every sample interval, the velocity noise filter 230 is updated with two new values, pulse_count, and a time variable.

Sampling interval, d_edge, is the difference between the latest moving average pulse_count array element and a previously stored element, measured over the selected $2^n$ average interval. Similarly, time interval, d_time, is the difference between the latest time variable value, clk_edge, and a previously stored time variable value, clk_edge, measured over the same time interval. Sampling interval, d_edge, therefore represents the number of new encoder edges or the change in the pulse_count value that occurred over the selected average interval. Similarly, time interval d_time is the change in time, measured from the first to last encoder edge, for the same sampling interval, d_edge, and average interval.

Various types of position feedback devices may be used, such as the encoder described above, a high resolution encoder, or a resolver, and the application of the present invention is not limited to any particular position feedback device. The velocity noise filter 230 operates on accumulated position and outputs a near ideal velocity value that is band-limited.

An exemplary transfer function for the velocity noise filter 230, independent of the position feedback device type, can be expressed as:

$$G(Z) = \frac{1 - Z^{-N}}{T_v N}, \quad (2)$$

where:
N=number of taps, typically ranging from 1 to 256 in powers of two,
$T_v$=sample time of the filter, and
$Z=\exp(sT_v)$ By configuring the number of taps, N, in the velocity noise filter 230, the bandwidth and anticipated noise level is controllable. In general, the bandwidth decreases as the number of taps increases and lower bandwidth reduces noise level. Noise is thus reduced by increasing N.

The velocity error filter 227 is implemented using a second order IIR filter. An exemplary transfer function for the filter 227 can be expressed as:

$$G(s) = \frac{1}{(1 + T_f s)^2}, \quad (3)$$

where $T_f$=filter time constant in seconds. A higher order filter is contemplated and may be employed in some embodiments. The velocity error filter 227 attenuates high frequency sidebands of the FIR velocity noise filter 230. The bandwidth of the velocity error filter 227 is typically set at a multiple of the bandwidth of the velocity noise filter 230. For instance, the bandwidth of the velocity error filter 227 may be set at 6 times that of the velocity noise filter 230. Other multiples, such as between about 3 and 9, or other values may be used. For example, in embodiments where the inertia adaption unit 290 is enabled, the bandwidth of the velocity error filter 227 may be set at 3 times the selected velocity bandwidth.

Figure 5:
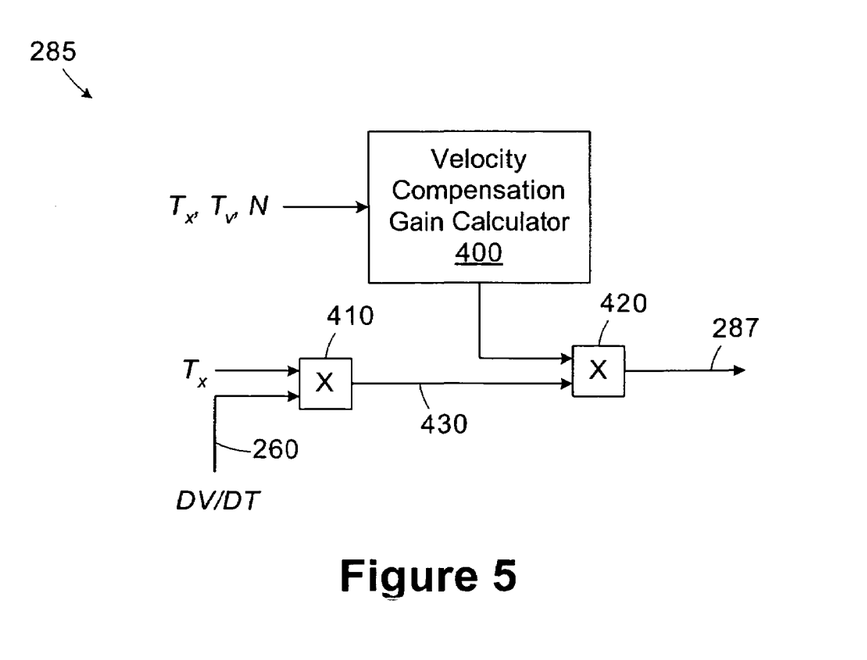
FIG. 5 is a block diagram of a velocity compensation unit in the motor control system of FIG. 3.

Turning now to FIG. 5, a simplified block diagram of the velocity compensation unit 285 of FIG. 3 is provided. The velocity compensation unit 285 includes a velocity compensation gain calculator 400 and two multipliers 410, 420 cooperating to generate the feed forward velocity compensation signal 287.

Referring again to FIG. 3, in the illustrated embodiment, position regulator 200 and velocity regulator 225 operate at different update intervals. $T_x$ represents the interrupt interval of the position regulator 200, and $T_v$ represents the interrupt interval of the velocity regulator 225. In the illustrated embodiment, the reference velocity signal 140 is oversampled at a rate 4 times that of the reference position signal 155, so $T_x=4T_v$. Other sampling rate arrangements are contemplated, including no oversampling, a higher level of oversampling, or a lower level of oversampling.

Velocity compensation unit 285 receives the sample time of velocity regulator 225 ($T_v$), the sample time of the position regulator 200 ($T_x$) and the time delay of the velocity noise filter 230 (i.e., based on N), during a commissioning procedure. In addition, compensation unit 285 receives the acceleration signal 260 (DV/DT) from the derivative module 255. However, in an embodiment without inertia compensation, the derivative module 255 may be incorporated into compensation unit 285.

Multiplier 410 multiplies the acceleration signal 260 by the position regulator sample time $T_x$. Multiplier 420 then multiplies the output of multiplier 410 by a velocity compensation gain factor, Vcomp_gain, generated by the velocity compensation gain calculator 400 to generate the velocity compensation signal 287 that is, in turn, provided as an input to summer 215 shown in FIG. 3.

Figure 7:
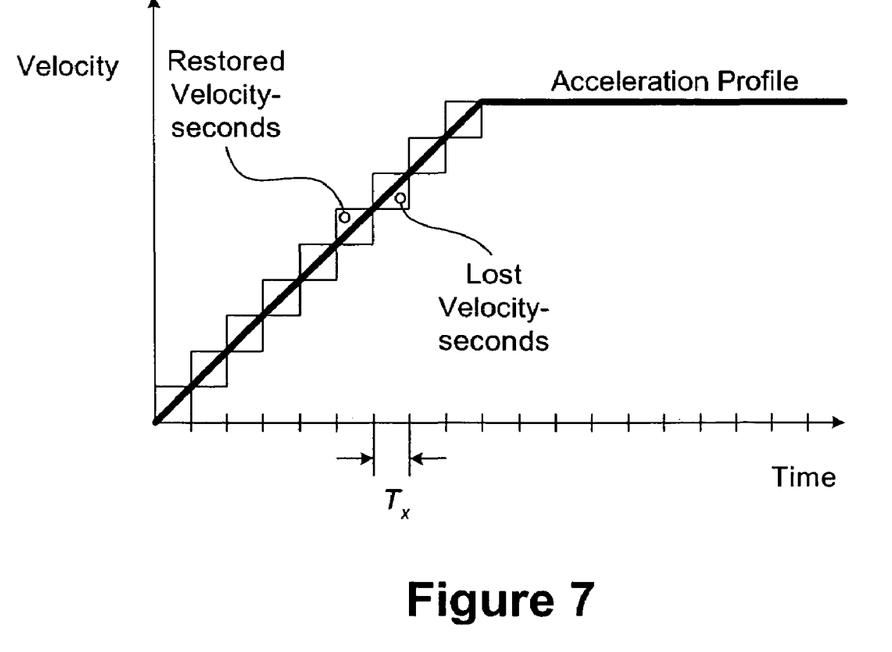
FIG. 7 is a graph of velocity versus time during an acceleration event illustrating lost velocity-seconds and velocity-seconds restored in accordance with the present invention.

To illustrate operation of velocity compensation unit 285, a simple example is described in which the velocity noise filter has one tap (i.e., n=0, N=2⁰=1). The value of Vcomp_gain is normalized to unity when n=0. The output 260 of the derivative module 255 and $T_x$ (sec) are multiplied by multiplier 410 to generate an intermediate velocity compensation signal 430. Note that in steady state, the value of intermediate velocity compensation signal 430 is zero because the value output by derivative module 255 is zero (i.e., no acceleration). When accelerating, the velocity compensation signal 287 restores an increment of velocity-seconds lost to the sample and hold process, as illustrated in FIG. 7. The velocity compensation unit 285 uses a feed forward compensation technique to anticipate the velocity seconds that are lost due to the discrete position samples and restore the lost velocity-seconds. Restoring lost velocity-seconds of the proper level secures an ideal correction and a near zero position error at the time of interrupt. The compensation provided by the velocity compensation signal 287 results in a reduced position error, thus reducing the observable performance difference between steady state and acceleration/deceleration periods of operation.

The velocity noise filter 230 imparts a delay that varies depending on the number of taps, N. It is known that delays through an FIR filter can be made precisely linear by design. Because the velocity noise filter 230 is linear in the illustrated embodiment, the filter delay is precisely known and can be factored into the compensation calculation of the velocity compensation gain calculator 400. The velocity noise filter 230 is run at the same sampling rate as the velocity regulator 225, $T_v$, at a task frequency that is an exact multiple of the position regulator 200. The velocity noise filter 230 could also be run at the same rate. In terms of timing, the velocity tasks could be performed after the position regulator 200 (i.e., $T_v$ after $T_x$) or before the position regulator 200 (i.e., $T_v$ before $T_x$). The timing relationships are predetermined. In either case, a precise formula can be applied via velocity compensation gain calculator 400 to restore lost velocity-seconds. The formula for Vcomp_gain where the velocity task is performed prior to the position task is:

$$\text{Vcomp\_gain} = 1 - \left[\frac{T_v}{T_x} \cdot \frac{(N-1)}{2}\right]. \qquad (4)$$

The formula for Vcomp_gain where the position task is performed prior to the velocity task is:

$$\text{Vcomp\_gain} = 1 - \left[\frac{T_v}{T_x} \cdot \frac{(N+1)}{2}\right]. \qquad (5)$$

Returning to FIG. 2, the reference velocity signal 140 and reference position signal 155 are sent to the other slave drives 110 controlling motors 112 that are to be operated synchronously with the motor 102. It should be appreciated in this regard that the master drive 100 sends signals to a plurality of slave drives 110. The cooperation between the master drive 100 and the slave drives 110 ensure that all motors operate at the same velocity and at the same position, and that adjustments are made to correct position errors when a feedback position of a given motor does not equal the reference position of the motor. Accordingly, only one virtual encoder 145 is necessary for a system operating a plurality of synchronously controlled motors.

Figure 8:
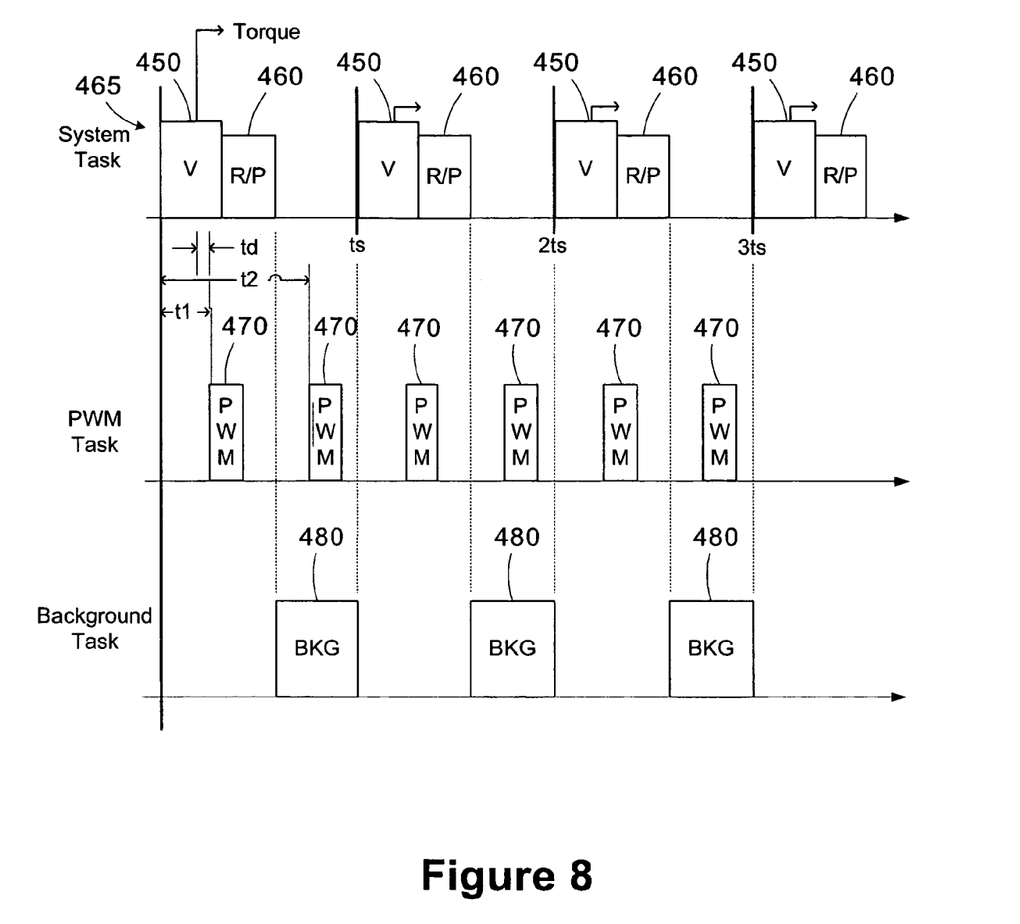
FIG. 8 is a timing diagram illustrating the synchronization of updates within the electronic line shaft of FIG. 2 and the motor control system of FIG. 3.

Turning now to FIG. 8, a timing diagram illustrating the synchronization between various updates in the electronic line shaft 10. The updates are generally categorized as tasks. A velocity task 450 is executed to perform the functions of the velocity regulator 225, velocity noise filer 230, and inertia adaption unit 290 (see FIG. 3), which may be referred to collectively as a velocity regulator, even though they are illustrated as separate entities. The output of the velocity task 450 is the torque reference signal 280. A reference and position task 460 is executed to perform the functions of the position regulator 200 (see FIG. 3), ramp generator 135, virtual encoder 145 (see FIG. 2), inertia compensation unit 250, and velocity compensation unit 285. Collectively, the velocity task 450 and reference and position task 460 may be referred to as a system task 465. The system task 465 performs the outer loop control. A PWM task 470 is performed for generating the torque input signal 120 based on the torque reference signal 280 in the motor controller 295. A background task 480 is provided to perform other housekeeping tasks.

Referring to FIGS. 3 and 8, the system task 465 may be performed by a first processor 485, and the PWM task 470 may be performed by a second processor 490. The processors 485, 490 are shown in phantom in FIG. 3 to indicate their association with the functional units shown.

In the illustrated embodiment, the velocity task 450 is performed at the same frequency as the reference and position task 460, and the PWM task 470 is performed at twice the frequency of the velocity task 450. Of course, other relative frequencies may be used. For example, the reference and position task 460 may only be performed every two or four iterations of the velocity task 450, depending on the characteristics of the controlled system. As illustrated, the velocity task 450 is performed prior to the reference and position task 460. The velocity task 450 is delayed one cycle with respect to the reference and position task 460. That is, a given reference and position task 460 (time=ts) generates data for the subsequent velocity task 450 occurring at the next system interrupt (2ts).

Generally, the tasks 465, 470 are synchronized using the synchronization signal 167, refer to FIG. 2, generated by the synchronization unit 165. Hence, even if the tasks are performed by different processors with different clock speeds, they can be phase delayed or offset with respect to one another to provide the most current information for each task. For example, because the system task 465 is the pacesetter, even though the PWM task 470 has the higher update frequency, the system task 465 can establish when the PWM task 470 starts to ensure that the PWM task 470 operates on the most recent velocity, position, and reference information.

Referring to FIG. 8, the time, t1, represents the time required for the system task 465 to generate the torque reference signal 280 shown in FIG. 3 plus a delay of td to ensure the availability of the current data to the subsequently occurring PWM task 470. Hence, the torque reference signal 280 is calculated td seconds prior to the start of the PWM task 470. The specific value of td may vary depending on the particular system implementation, which may affect the time required to generate the required data for the next loop. The interval for the second PWM task 470 in a single interrupt is defined as t2, which for the illustrated implementation (e.g., 2 PWM updates per interrupt) is t2=t1+ts/2.

The synchronization of the task times for the system task 465 and the PWM task 470 for drives with multiple processors improves the ability of the motor drive 100, 105 to provide predictable and accurate performance. This synchronization assures that all loops are executing at proper intervals with respect to one another such that information flows from one task to another at the appropriate time to provide the most current information, thereby minimizing staleness of the control signals. This control method eliminates the potential for frequency modulation or beat frequencies occurring between the control loops.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A motor control system for controlling a motor, comprising:
a first processor configured to generate a reference control signal at a first periodic time responsive to a synchronization signal;
a second processor configured to generate a drive signal for the motor based on the reference control signal at a second periodic time; and
wherein the second periodic time is delayed from the first periodic time by a first time interval associated with the time required for the first processor to generate the reference control signal and a predetermined delay interval selected to minimize a staleness of the reference control signal.

2. An electronic line shaft, comprising:
a synchronization unit operable to generate a synchronization signal; and
a plurality of drive units controlled in accordance with a common reference signal, each drive unit including:
control logic operable to generate a torque reference signal at a first periodic time responsive to the synchronization signal, the torque reference signal being generated based on the common reference signal and at least one feedback signal; and
a motor controller operable to generate a drive signal for the motor based on the torque reference signal at a second periodic time, the second periodic time being delayed from the first periodic time by a first time interval associated with a time required for the control logic to generate the torque reference signal.

3. The electronic line shaft of claim 2, wherein the control logic is operable to generate the torque reference signal as a function of at least one of a velocity error signal, a position error signal, an inertia compensation signal, and an inertia adaption signal.

4. The electronic line shaft of claim 2, wherein the first time interval is selected to minimize a staleness of the torque reference signal.

5. The electronic line shaft of claim 2, wherein the control logic is operable to perform a velocity task and a position/reference task.

6. The electronic line shaft of claim 5, wherein the control logic is operable to perform the velocity task prior to the position reference task, and the position/reference task is operable to generate position/reference data for a subsequent iteration of the velocity task.

7. The electronic line shaft of claim 5, wherein the control logic is operable to execute the velocity task at a first frequency and the position/reference task at a second frequency less than the first frequency.

8. The electronic line shaft of claim 2, wherein the motor controller is operable to perform a pulse width modulation (PWM) task based on the torque reference signal to generate the drive signal.

9. The electronic line shaft of claim 8, wherein the control logic is operable to perform a system task to generate the torque reference signal at a first frequency, and the motor controller is operable to perform the PWM task at a second frequency greater than the first frequency.

10. The electronic line shaft of claim 9, wherein the second frequency is a function of the first periodic time and the first time interval.

11. The electronic line shaft of claim 2, wherein the control logic comprises a first processor operable to perform a system task, and the motor controller comprises a second processor operable to generate the drive signal.

12. The system of claim 1, further comprising:
a synchronization unit operable to generate a synchronization signal;
wherein the first processor is part of a control logic of one of a plurality of drive units controlled in accordance with a common reference signal, wherein the control logic is operable to generate a torque reference signal that is part of the reference control signal at the first periodic time responsive to the synchronization signal, the torque reference signal being generated based on the common reference signal and at least one feedback signal; and wherein the second processor is part of a motor controller operable to generate a drive signal for an associated motor based on the torque reference signal at the second periodic time.

13. The system of claim 1, wherein the reference control signal includes a torque reference signal and wherein the first time interval is selected to minimize a staleness of the torque reference signal.

14. A method for controlling multiple motors using a plurality of drive units controlled in accordance with a common reference signal, the method comprising:
generating a synchronization signal; and
responsive to the synchronization signal, generating a torque reference signal at a first periodic time;
generating a drive signal for each of the multiple motors based on the torque reference signal at a second periodic time, the second periodic time delayed from the first periodic time by at least a first time interval required to generate the torque reference signal.

15. The method of claim 14, wherein the at least one feedback signal includes at least one of a motor velocity feedback signal and a motor position feedback signal.

16. The method of claim 15, further comprising generating the torque reference signal as a function of at least one of a velocity error signal, a position error signal, an inertia compensation signal, and an inertia adaption signal.

17. The method of claim 14, wherein the second periodic time is delayed from the first periodic time by the first time interval plus a fixed delay time interval.

18. The method of claim 14, wherein the first time interval is selected to minimize a staleness of the torque reference signal.

19. The method of claim 14, further comprising executing a system task comprising a velocity task and a position/reference task to generate the torque reference signal and wherein the first time interval corresponds to at least a time required to complete the system task.

20. The method of claim 19, further comprising performing the velocity task prior to the position/reference task, and wherein the position/reference task is operable to generate position/reference data for a subsequent iteration of the velocity task.

21. The method of claim 20, further comprising executing the velocity task at a first frequency and the position/reference task at a second frequency less than the first frequency.

22. The method of claim 14, further comprising performing a pulse width modulation (PWM) task based on the torque reference signal to generate the drive signal.

23. The method of claim 22, further comprising performing a system task for generating the torque reference signal at a first frequency, and performing the PWM task at a second frequency greater than the first frequency.

* * * * *